United States Patent [19]

Hirota et al.

[11] Patent Number: 5,104,739
[45] Date of Patent: Apr. 14, 1992

[54] LAMINATED MAGNETIC MATERIAL AND METHOD OF PRODUCING THE SAME

[75] Inventors: Ken Hirota, Toyonaka; Mitsuo Satomi, Katano; Koichi Kugimiya, Toyonaka, all of Japan

[73] Assignee: Matsushita Electric Industrial Co., Ltd., Osaka, Japan

[21] Appl. No.: 425,876

[22] Filed: Oct. 24, 1989

[30] Foreign Application Priority Data

Oct. 31, 1988 [JP] Japan .................. 63-274830

[51] Int. Cl.⁵ .......................................... B32B 15/04
[52] U.S. Cl. ...................................... 428/457; 29/603; 204/192.2; 360/126; 428/900; 428/906
[58] Field of Search .................. 428/900, 457, 906; 360/126; 29/603; 204/192.2

[56] References Cited

U.S. PATENT DOCUMENTS

| | | | |
|---|---|---|---|
| 4,025,379 | 5/1977 | Whetstone | 428/900 X |
| 4,535,376 | 8/1985 | Nomura et al. | 360/126 |
| 4,846,948 | 7/1989 | Saito et al. | 204/192.2 |
| 4,894,742 | 1/1990 | Saito et al. | 360/126 |
| 5,001,590 | 3/1991 | Saito et al. | 360/126 X |

FOREIGN PATENT DOCUMENTS

| | | |
|---|---|---|
| 53-57493 | 5/1978 | Japan . |
| 57-8922 | 1/1982 | Japan . |
| 60-195710 | 10/1985 | Japan . |
| 62-67712 | 3/1987 | Japan . |

OTHER PUBLICATIONS

*IBM Technical Disclosure Bulletin*, vol. 12, No. 4, pp. 562–563, "Laminated Structures", G. W. Brock et al, Sep. 1969, New York, U.S.

*Primary Examiner*—Thomas J. Herbert, Jr.
*Attorney, Agent, or Firm*—Stevens, Davis, Miller & Mosher

[57] ABSTRACT

A laminated magnetic material suitable for use as a material of a magnetic core has a plurality of layers of an Fe-Si-Al type magnetic metal and a plurality of electrically insulating layers both of which layers are laminated alternatingly, the magnetic metal containing 0.001 to 0.3 wt % of oxygen. The laminated magnetic material can be produced by forming, on a base film, a film made of a magnetic powder of an Fe-Si-Al type metal containing 0.001 to 0.3 wt % of oxygen, separating the film of the magnetic powder from the base film, laminating the separated film of magnetic powder so as to form a laminated structure, and extruding the laminated structure.

1 Claim, 2 Drawing Sheets

LAMINATED MAGNETIC MATERIAL AND METHOD OF PRODUCING THE SAME

BACKGROUND OF THE INVENTION

The present invention relates to a soft magnetic material, in particular a metallic magnetic material suitable for use as the material of a magnetic head, and also to a magnetic head made of such a magnetic material.

Hitherto, a hard Fe—Si—Al type alloy known as sendust alloy has been used as a metallic magnetic material for use as the material of magnetic heads.

This metallic magnetic material has a high magnetic flux density saturation level but exhibits a large eddy current loss and, hence, a low magnetic permeability particularly at a high-frequency region due to too low electrical resistance. In addition, this material exhibits inferior wear resistance against abrasion by magnetic tape, as compared with ferrite-type magnetic heads made of oxide magnetic materials.

In order to obviate these problems encountered when this type of magnetic material is used as the material of a magnetic head, i.e., to reduce eddy current loss a in high-frequency range, a magnetic head called an "alloy laminated type magnetic head" has been proposed in which the metallic magnetic material is in a shape of thin film-type members stacked with an electrically insulating layer being interposed between adjacent one of the thin members.

An example of such an alloy laminated type magnetic head is a so-called sandwich type magnetic head which is produced by forming a thin alloy film on a substrate by a thin-film forming technique such as sputtering or evaporative deposition followed by formation of an intermediate insulation layer thereon, the thin alloy films and the insulation layers being formed alternatingly until a laminate of a predetermined thickness is formed, with the other substrate bonded by, for example, a glass bonding technique.

This known magnetic head having a laminated structure not only requires an expensive production apparatus such as a vacuum evaporation apparatus or a sputtering apparatus but requires an impractically long time due to a too small deposition speed. In fact, the deposition speed is as low as 500 Å/min or so even when a magnetron-type apparatus is used, when the quality of the film is strictly controlled. When a magnetic head having a track width of 50 microns is to be produced, it takes about 17 hours even for the formation of a single layer. The production time will be multiplied for laminating a plurality of such single layers.

Another problem encountered with the sandwich-type laminated magnetic head is that the substrates and the magnetic material exhibit different amounts of wear after the use of the magnetic head in contact with a running tape.

Thus, the magnetic material for use as a material of magnetic heads is required to have high levels of saturation magnetic flux density and electrical resistance.

There is also a demand for a laminated magnetic head which can be produced quickly and efficiently and at a low cost without requiring any expensive thin-film forming apparatus and which exhibits a high resistance to wear when used in contact with a running magnetic tape.

SUMMARY OF THE INVENTION

In order to cope with these demands, the present invention provides a laminated magnetic material having both layers of Fe—Si—Al magnetic metal alloy composed mainly of Fe, Si and Al; and electrically insulating layers laminated alternatingly, with the magnetic metal containing 0.001 to 0.3 wt % of oxygen.

DESCRIPTION OF THE PREFERRED EMBODIMENT

Figure 1A:
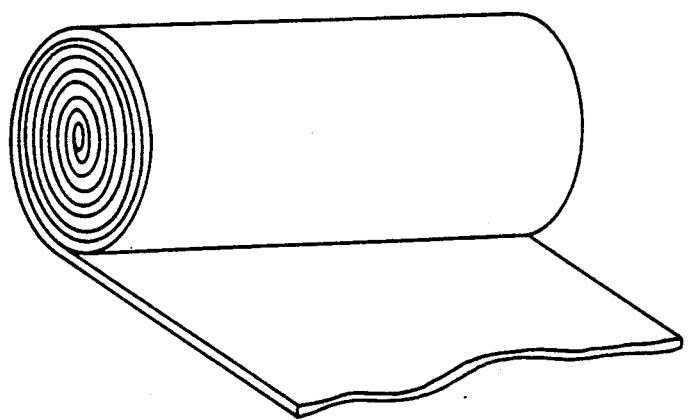
FIGS. 1A to 1C are perspective views of a green sheet illustrative of an Fe—Si—Al magnetic core used in an embodiment of the present invention, showing also a manner in which a laminated magnetic core is cut out from a sintered material obtained by heat-treating the green sheet.

A description will be given of an embodiment of the magnetic material of the present invention, in particular characteristics and production process, as well as of a magnetic head which is made of the magnetic material of the present invention.

High-purity elements Si, Al and Fe, having purity levels of 99.98% or higher, were accurately weighed to obtain a final composition containing 9.5 wt % of Si, 5.5 wt % of Al and 85 wt % of Fe. These elements were melted in a vacuum atmosphere by high-frequency induction heating so that an Fe—Si—Al master alloy known as sendust was formed. The master alloy was subjected to a 2-hour heat treatment conducted at a temperature of 700° to 1000° C. in an atmosphere containing 0.01 vol % of oxygen gas and the balance Ar. The heat-treated sendust alloy was analyzed and proved that it contained 0.005 wt % of oxygen.

A ring of 8 mm in outside diameter, 4 mm in inside diameter and 0.2 mm in thickness was cut out from the heat-treated sendust alloy, and was subjected to an evaluation of magnetic characteristics. The ring of the above-described composition showed a saturation magnetic flux density of 8,000 G or greater, and magnetic permeability $\mu$ of 3,000 or higher and 1,000 at 100 KHz and 5 MHz, respectively.

The alloy was mechanically crushed to obtain powder, and a plurality of magnetic metal layers were formed from the powder. A plurality of electrically insulating layers were laminated alternatingly in a manner which will be described later, so as to obtain a magnetic material.

The laminated magnetic material was heat-treated in an atmosphere while the oxygen content of the atmosphere was varied, and the magnetic characteristics and wear resistance were evaluated in relation to the oxygen content of the magnetic metal after the heat treatment. It was found that both superior magnetic characteristics and high wear resistance were simultaneously attained by magnetic metals having oxygen contents ranging between 0.001 m wt % (10 ppm) and 3.0 wt %. For the purpose of measurement of magnetic permeability, a toroidal ring of 8 mm in outside diameter, 4 mm in inside diameter and 0.5 mm in thickness was cut out of the laminated material. The measurement was conducted at 100 KHz with a vector-impedance meter to confirm magnetic permeability values of 1000 to 5000. These magnetic permeability values are considered to be enough to enable the tested material to be used as a magnetic core of a magnetic head.

Heat-treatment were conducted under a different condition for the purpose of comparison. More specifically, the heat treatment was conducted at 800° C. in an atmosphere having smaller oxidation tendency, e.g., $N_2$ gas. In this case, the magnetic metal after the heat-treatment had a small oxygen content of 0.001 wt % or less and exhibited impractically small wear resistance. Heat-treatment was also conducted under a different condition of a greater oxidation tendency, e.g., in an atmosphere containing 30 vol % of oxygen at 1100° C. The magnetic metal after this heat-treatment had an oxygen content of 3 wt % or greater, thus exhibiting superior resistance to wear. Unfortunately, however, the magnetic permeability was as small as 100 or less, failing to meet a requirement of 500 or greater which is generally required for materials of magnetic cores of magnetic heads.

Figure 1B:
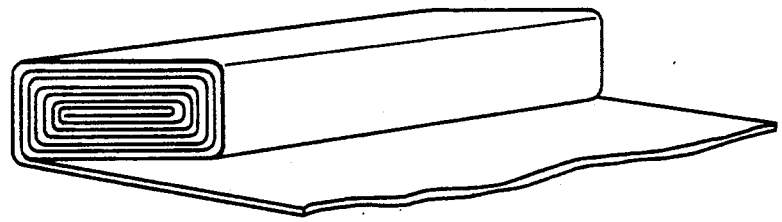

The Fe—Si—Al alloy prepared by high-frequency melting was mechanically crushed into fine powder having a mean particle size of about 2 μm. Then, 5 g of camphor, 2 g of dibutyl phthalate, 20 g of ethyl acetate and 30 g of butyl acetate were added to 100 g of the above-mentioned Fe—Si—Al powder, and the mixture was blended by a ball mill for 20 hours, whereby a slurry was obtained. On the other hand, $SiO_2$ was made to deposit on the surface of a PET (polyethylene terephthalate) film in a thickness of about 3000 Å. The above-mentioned slurry was applied to this surface of the PET film to form a layer of about 20 μm thick and, after drying, the layer was peeled off from the PET film and was wound in a spiral or coiled form as shown in FIG. 1(A) or 1(B). Although not illustrated, the $SiO_2$ which was beforehand applied to the surface of the PET film has been transferred to one side of the coiled Fe—Si—Al film.

Figure 1C:
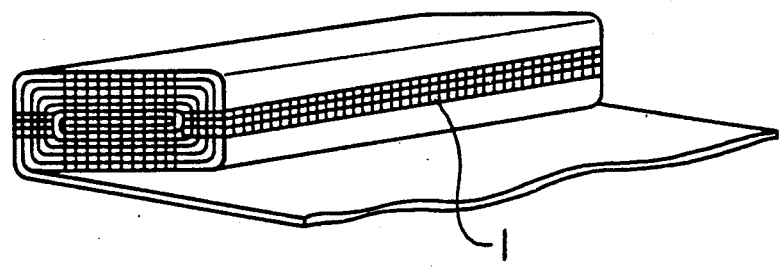
Figure 2A:
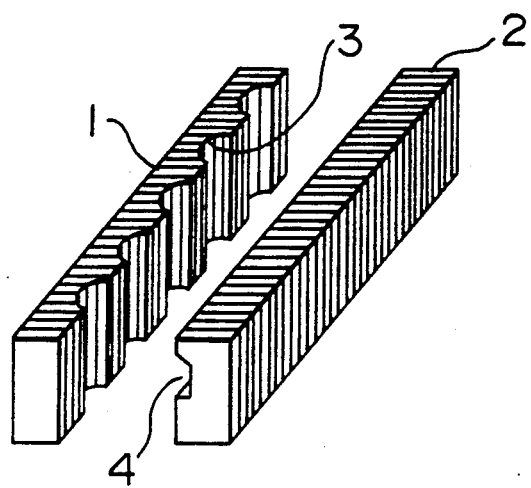
FIGS. 2A to 2C are perspective views for illustrating a process for producing a magnetic head from a laminated magnetic core prepared in accordance with the present invention.

The coiled Fe—Si—Al film was then heated to 200° C. in an inert gas atmosphere so as to remove the binder component and was placed in an evacuated vessel made of a stainless steel. The stainless steel vessel containing therein the Fe—Si—Al film was heated to 1000° C. by induction heating in the air and was hot-extruded such that the diameter of the container is reduced to ⅓. Then, a laminated magnetic core was cut out from the extruded material, in a manner shown in FIG. 1(C). Thus, the laminated core was composed of a plurality of Fe—Si—Al alloy layers of about 5 μm and insulating $SiO_2$ layers laminated such that the Fe—Si—Al layers and the $SiO_2$ layers are stacked alternatingly. This laminated core material was then cut into two segments as shown in FIG. 2(A) and notches 3 and winding window 4 were formed in these segments in a manner shown in FIG. 2(A).

The laminated core material thus obtained was then subjected to a heat-treatment which was conducted for the purpose of improving the wear resistance. It is known that, when a material is heat-treated in the flow of gas containing oxygen or in a vacuum containing trace amounts of oxygen, a layer having superior wear resistance is formed on the surface of the treated material. Conventionally, such a heat treatment for improving wear resistance of a magnetic head is conducted after completion of formation of a head tip. According to the invention, however, the heat-treatment was executed after formation of the notches 3 and the winding window 4 so that superior wear resistance was able to be obtained substantially over an entire region of tape-contact portion of the magnetic head. Needless to say, the winding window 4 is so positioned that the depth of the gap approximates the final gap depth as much as possible.

Preferably, the heat-treatment was conducted by heating the material for 20 hours at a temperature which was not lower than 850° C. but below 1050° C. in an inert gas containing about 50 ppm of oxygen or in a vacuum containing about 50 ppm of oxygen.

It was confirmed that a heat treatment executed at a temperature not higher than 850° C. or not lower than 1050° C. cannot provide sufficient resistance to wear.

Figure 2B:
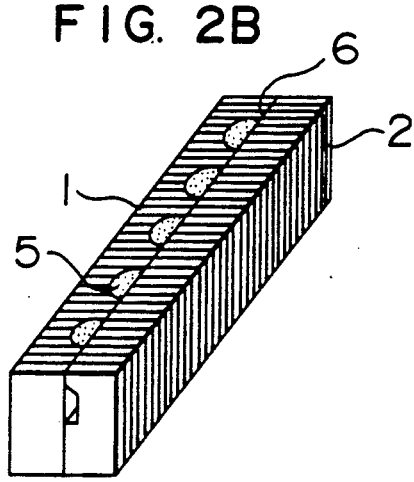
Figure 2C:
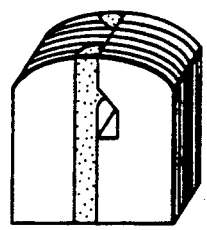

Subsequently, the notches 3 were filled with a glass 5 and the abutting surfaces 6 of both core segments 1 and 2 was mirror finished. Then, the core segments 1 and 2 were brought together across a gap spacer (not shown) of a predetermined thickness, whereby a gap was formed as shown in FIG. 2(B). Then, a piece which serves as a head tip was cut out in a form as shown in FIG. 2(C).

The magnetic head having thus been obtained was subjected to a test in which it was used in contact with a running tape on an actual VTR unit. As a result, it was confirmed that this magnetic head can stably produce a head output for a long time. The magnetic head also showed a sufficiently small amout of wear of 10 to 22 μm/500 hours (tape sliding area 0.13×2 mm²).

For the purpose of comparison, a magnetic head having a laminated core prepared without the aforementioned heat-treatment and a magnetic head having a laminated core having an oxygen content below 0.001 wt % were tested under the same condition. These magnetic heads showed large amounts of wear of 40 to 70 μm/500 hours.

In the described embodiment, a green sheet made of an Fe—Si—Al film and an $SiO_2$ film was wound into a coil having a circular cross-section as shown in FIG. 1(A) or, taking into the yield account, a rectangular cross-section as shown in FIG. 1(B), and the laminated core material was cut out of such a coil and then subjected to the heat-treatment. In addition, notches were formed only in one of the head core segments. It is, however, preferred that such notches are provided in both of the core segments.

Although the Fe—Si—Al alloy containing 9.5 wt % of Si, 5.5 wt % of Al and 85 wt % of Fe was used in the described embodiment, the invention can be carried out with other types of Fe—Si—Al alloys or other alloys, including permalloy and amorphous alloys. The $SiO_2$ used as an insulation film applied to the surface of the PET film can also be replaced by other materials which are thermally stable and which do not react with the magnetic material, such as non-magnetic and electrically insulating ceramics, e.g., oxides including $Al_2O_3$ and $ZrO_2$, as well as nitrides and carbides. In the described embodiment, the electrically insulating layer of the laminated magnetic material was formed by applying a powdered non-magnetic insulating material on a base film and then allowing the layer of the powder to be transferred to the Fe—Si—Al film. This, however, is only illustrative and the insulating layer may be formed by other suitable methods such as spraying, printing and spinning.

For the purpose of comparison, a test was carried out with a magnetic core which was formed of a magnetic material which was heat-treated in the same manner as that in the described embodiment with the exception that a single bulk material was used. The magnetic permeability of this magnetic head for comparison, when measured under the same condition as the embodiment at a high frequency, e.g., 100 KHz, was 30 to 50 which was much smaller than the magnetic permeability values of 1000 to 5000 attained by the magnetic head made from the magnetic material of the present invention.

In order to improve the mechanical strength of the magnetic head, the laminated core material composed of the oxygen-containing magnetic metal layers and electrically insulating layers laminated alternatingly may be bonded to substrates of a non-magnetic material. In such a case, since the mechanical strength is improved, the laminated magnetic material may be formed by ordinary methods such as sputtering, evaporative deposition or a CVD method.

As has been described, according to the present invention, it is possible to obtain a metallic magnetic material which exhibits superior characteristics at high frequencies, as well as excellent mechanical characteristics, particularly wear resistance. In addition, according to the invention, a laminated magnetic core can be formed quickly and efficiently at a reduced cost, without employing any expensive thinfilm forming apparatus. The magnetic core formed in accordance with the present invention exhibits superior magnetic characteristics at high frequencies by virtue of the laminated type structure, as well as high resistance to wear. According to the invention, therefore, it is possible to obtain a magnetic head which exhibits superior wear resistance and which does not necessitate any substrate. In consequence, the magnetic head can be used in contact with a running magnetic tape for a long time without any problems of local or uneven wear which is inevitable in conventional magnetic heads. In addition, the magnetic head formed from the laminated magnetic material of the present invention is simple in construction and, hence, easy to produce.

What is claimed is:

1. A laminated magnetic material comprising a plurality of layers of an Fe—Si—Al magnetic metal alloy mainly composed of Fe, Si and Al; and a plurality of electrically insulating layers both of which layers are laminated alternatingly, said magnetic metal containing 0.001 to 0.3 wt % of oxygen.

* * * * *